N. DROLSON.
RUNNING BOARD STRUCTURE OF BOX CARS.
APPLICATION FILED JAN. 28, 1914.

1,113,888.

Patented Oct. 13, 1914.

Inventor
Nels Drolson

Witnesses
H. B. Byrd
D. W. Gould

By Victor J. Evans
Attorney

UNITED STATES PATENT OFFICE.

NELS DROLSON, OF SUPERIOR, WISCONSIN.

RUNNING-BOARD STRUCTURE OF BOX-CARS.

1,113,888.  Specification of Letters Patent.  Patented Oct. 13, 1914.

Application filed January 28, 1914.  Serial No. 815,014.

*To all whom it may concern:*

Be it known that I, NELS DROLSON, a citizen of the United States, residing at Superior, in the county of Douglas and State of Wisconsin, have invented new and useful Improvements in Running-Board Structures of Box-Cars, of which the following is a specification.

The invention relates to an improvement in the running board structure of box cars, and particularly to a saddle, whereby the running boards may be quickly and conveniently secured in place, held against the possibility of accidental movement, and readily removed when necessary.

The main object of the present invention is the provision of a saddle having combined therewith a plate cover between which and the saddle the running boards are secured, the saddle being provided with means for engaging the running board.

The invention in the preferred form of details will be described in the following specification, reference being had particularly to the accompanying drawings, in which:—

Figure 1:
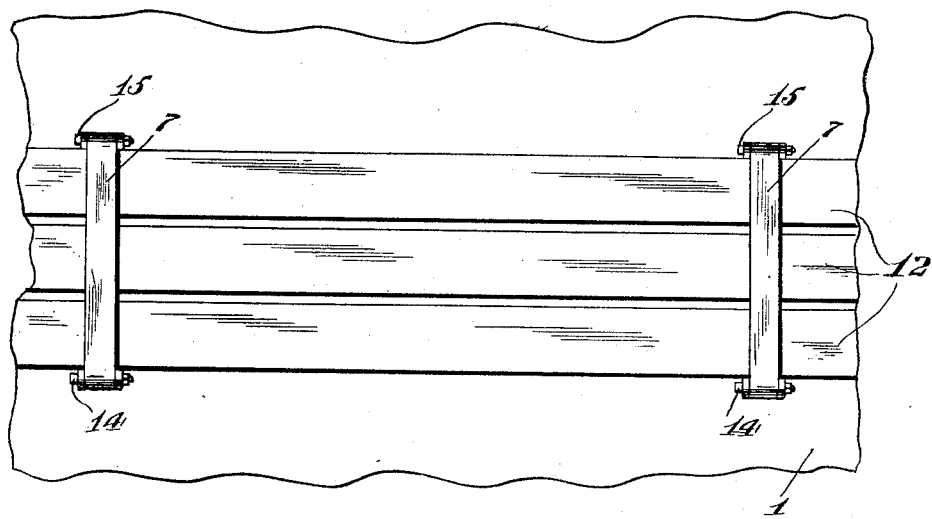
Figure 2:
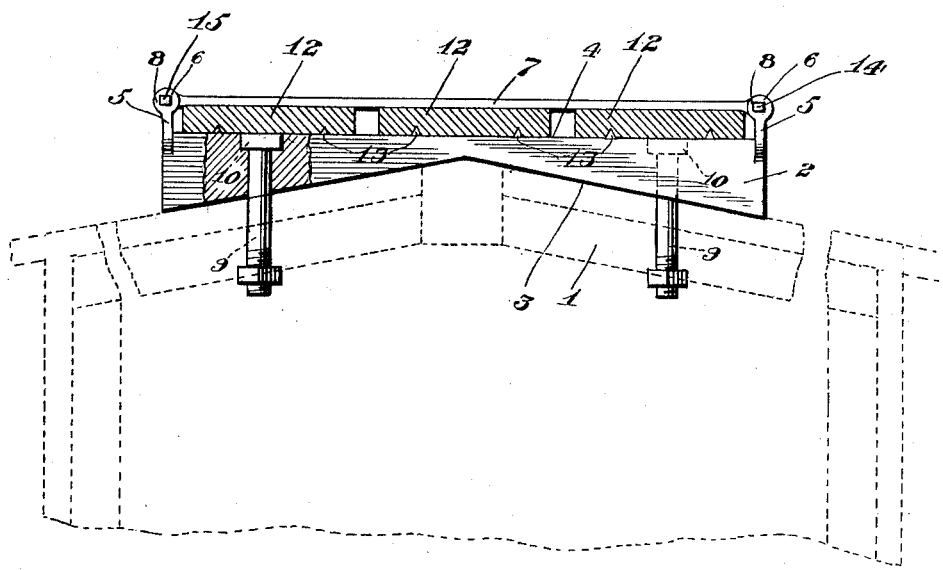

Figure 1 is a broken plan, illustrating the application of the improvement. Fig. 2 is a transverse section of the same, the car being shown in dotted outline.

In carrying out the invention I secure upon the roof 1 of the car the improved saddle comprising a saddle proper 2 having a length less than the width of the car and the under or lower surface 3 shaped to conform to the shape of the car. The upper surface 4 is flat, parallel to the car floor and at each end of the saddle are retainers 5 in the form of spaced rods having terminal eyes 6.

A cover plate 7 is provided having a length slightly exceeding the distance occupied by the floor boards, said cover plate being terminally provided with eyes 8 and adapted to fit between the eyes 6 of the saddle.

The saddles 2 are secured at approximately spaced intervals on the roof of the car through the medium of bolts 9 having heads 10 and fitting in recesses or countersinks in the upper surface of the saddle. The floor boards 12 are then positioned upon the saddle resting upon the surface 4 thereof, said surface being provided with spurs 13 adapted to be forced into the floor boards in placing the latter in position. The cover plate is then connected at one end to the eyes 6 by bolts 14, forcing down into contact with the upper surface of the floor boards, and secured at opposite ends to the eye 6 by bolt 15.

The improved structure secures the floor boards against accidental separation, permits their ready application or removal from the saddle and eliminates the use of nails and bolts usually employed for this purpose.

What is claimed:—

A saddle for car roofs including a member adapted to be bolted to the roof of the car, said member being provided with terminal spaced eyes, and a cover plate having terminal eyes to be secured to the eyes of the saddle, the upper surface of the saddle being formed with spurs to engage the floor boards.

In testimony whereof I affix my signature in presence of two witnesses.

NELS DROLSON.

Witnesses:
THORVAL FRANTSEN,
LOUIS NELSON.

Copies of this patent may be obtained for five cents each, by addressing the "Commissioner of Patents, Washington, D. C."